(12) United States Patent
Nagarajan et al.

(10) Patent No.: US 7,406,082 B2
(45) Date of Patent: Jul. 29, 2008

(54) SEQUENCE NUMBER SCHEMES FOR ACCEPTANCE/REJECTION OF DUPLICATED PACKETS IN A PACKET-BASED DATA NETWORK

(75) Inventors: Ramesh Nagarajan, Somerset, NJ (US); Vinay D. Purohit, Branchburg, NJ (US); Muhammad A. Qureshi, Metuchen, NJ (US); Yung-Terng Wang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1079 days.

(21) Appl. No.: 10/261,090

(22) Filed: Sep. 30, 2002

(65) Prior Publication Data

US 2004/0062248 A1  Apr. 1, 2004

(51) Int. Cl.
*H04L 12/28* (2006.01)
(52) U.S. Cl. ...................... 370/394; 370/401
(58) Field of Classification Search ........... 370/394, 370/252, 253, 390, 401
See application file for complete search history.

(56) References Cited

U.S. PATENT DOCUMENTS

| | | | |
|---|---|---|---|
| 5,671,213 A * | 9/1997 | Kurano | 370/218 |
| 5,793,976 A * | 8/1998 | Chen et al. | 709/224 |
| 6,507,586 B1 * | 1/2003 | Satran et al. | 370/432 |
| 6,778,501 B1 * | 8/2004 | Malmgren et al. | 370/236 |
| 6,853,641 B2 * | 2/2005 | Lindhorst-Ko et al. | 370/394 |
| 6,928,078 B2 * | 8/2005 | Mesiwala et al. | 370/394 |
| 6,978,384 B1 * | 12/2005 | Milliken | 726/26 |
| 6,985,454 B1 * | 1/2006 | Wiedeman et al. | 370/316 |
| 7,000,120 B1 * | 2/2006 | Koodli et al. | 713/1 |
| 2002/0071241 A1 * | 6/2002 | Lockridge | 361/601 |

* cited by examiner

*Primary Examiner*—Huy D. Vu
*Assistant Examiner*—Christine Ng

(57) ABSTRACT

In a packet-based data network, packets are duplicated and a sequence number is inserted into each duplicate packet, where the duplicate packets are transmitted along two different paths from a source node to a destination node in the network. Depending on the implementation, the source node inserts different types of sequence numbers into the duplicate packets, and the destination node processes those sequence numbers accordingly to determine whether to accept or reject each received packet. In certain implementations, the number of sequence bits allocated to each packet is smaller than the size of the effective sequence number for the packet as interpreted by the destination node.

15 Claims, 17 Drawing Sheets

```
 1  Variables:
 2      sender_seq_no     /*  variable keeping track of sequence number on sender's side
 3                            */
 4      rec_seq_no        /*  the sequence number of the received packet */
 5      select_counter    /*  N bits counter at the receiver that keeps track of the
 6                            sequence number of the next expected packet */
 7      window_sz         /*  size of the window (less than 2^N) */
 8
 9  Initialization:
10      sender_seq_no = 0;
11      select_counter = 0;
12
13  Sender:
14      Assign sender_seq_no to packet;
15      Transmit one copy of the packet on each mated LSP;
16      sender_seq_no += 1;
17
18  Receiver:
19      If (rec_seq_no is outside of the sliding window defined by [select_counter,
20      select_counter+window_sz])
21          Reject the packet;
22      Else               /*  the rec_seq_no is in the window */
23      {
24          Accept the packet;
25          select_counter = rec_seq_no +1;
26      }
```

FIG. 2

```
1  Variables:
2      sender_seq_no       /*   variable keeping track of sequence number on sender's side
3                               */
4      rec_seq_no          /*   the sequence number of the received packet */
5      select_counter      /*   N bits counter at the receiver that keeps track of the
6                               sequence number of the next expected packet */
7      window_sz           /*   size of the window (less than $2^N$) */
8
9  Initialization:
10     sender_seq_no = 0;
11     select_counter = 0;
12
13 Sender:
14     Assign sender_seq_no to packet;
15     Transmit one copy of the packet on each mated LSP;
16     sender_seq_no += 1;
17
18 Receiver:
19     If (rec_seq_no is outside of the sliding window defined by [select_counter,
20     select_counter+window_sz])
21         Reject the packet;
22     Else                    /*   the rec_seq_no is in the window */
23     {
24         Accept the packet;
25         select_counter = rec_seq_no +1;
26     }
```

FIG. 3

```
1   Variables:
2       sender_seq_no       /*  variable keeping track of sequence number on sender's side
3                               */
4       frame_bit           /*  the most significant bit of the sequence number of
5                               the received packet */
6       last_frame_bit      /*  the most significant bit of the sequence number of the last
7                               accepted packet */
8       rec_seq_no          /*  (N-1) least significant bits of the N-bit sequence
9                               number of the received packet */
10      select_counter      /*  (N-1) least significant bits of the N-bit sequence number of
11                              the next expected packet */
12
13  Initialization:
14      frame_bit = 0;
15      last_frame_bit = 0;
16      sender_seq_no = 0;
17      select_counter = 0;
18
19  Sender:
20      Assign sender_seq_no to packet;
21      Transmit one copy of the packet on each mated LSP;
22      sender_seq_no += 1;
23
24  Receiver:
25      If (frame_bit == last_frame_bit) {
26          If (rec_seq_no ≥ select_counter) {
27              Accept the packet;
28              select_counter = rec_seq_no + 1;
29          }
30          Else {
31              Reject the packet;
32          }
33      Else {
34          If (rec_seq_no < select_counter) {
35              last_frame_bit = frame_bit;
36              Accept the packet;
37              select_counter = rec_seq_no + 1;
38          }
39          Else {
40              Reject the packet;
41          }
42      }
```

FIG. 4

```
1   Sender:
2       Maintain the next N-bit sequence # for the flow.
3       Transmit two copies of each packet, one to each data path, with the lower P bits
4       of the N-bit sequence number.
5       Update the next N-bit sequence #.
6
7   Receiver:
8       Maintains for each data path i:
9           A Q-bit cycle # cycle_i.
10          A P-bit sequence # m_i of the next expected packet from data path i.
11
12      Initialize:
13          cycle_i=0 for each data path i.
14
15      Update:
16          When receive a new packet from data path i with P-bit sequence # z_i,
17          Compare against the P-bit sequence # m_i expected for data path i.
18          if z_i >= m_i, cycle_i remains same.
19          If z_i< m_i, cycle_i = cycle_i+1.
20
21          Then prepend Q-bit cycle_i to P-bit sequence # z_i of the packet to form
22          the full N-bit sequence # f_i and pass it to the selector.
23
24  Selector:
25      Maintain the last accepted full N-bit sequence # F.
26
27      When receive a new packet, compare its full sequence number f_i against the
28      last accepted full sequence number F.
29      If f_i <= F
30          discard the packet;
31      else
32          accept the packet;
33          update F with f_i.
```

FIG. 5A

```
1   Transmit Side:
2
3   Variables:
4
5       Seq_num_counter;        /* N-1 bits counter to keep track of current
6                                  sequence number value */
7       MSB_flag;               /* Value of the most significant bit in the
8                                  next transmitted packet */
9   Initial Values:
10
11      Seq_num_counter = 0;
12      MSB_flag = 0;
13
14  Procedures:
15
16  • On the receipt of an indication that the failed path has recovered after the failure that
17    is at the start of feeding on both paths:
18
19      ⇒ Seq_num_counter = 0;
20      ⇒ MSB_flag = 0;
21
22  • On receipt of each packet that needs to be dual-fed {
23
24      ⇒ Fill in-band sequence bits in the header using values of MSB_flag (at the
25        most significant bit) and seq_num_counter;
26      ⇒ Attach the header to the packet;
27      ⇒ Dual-feed the packet on two diverse LSPs;
28
29      If (MSB_flag == 0  &&  seq_num_counter == 2^(N-1)) {
30          ⇒ MSB_flag = 1;
31      }
32
33      ⇒ Seq_num_counter += 1;
34
35  } END
36
37
38  Receive Side:
39
40  Variables:
41
42      delay_counter;          /* Q bits counter */
43      select_counter;         /* (N-1) bits counter */
44      LSP_flag;               /* Assume value of '0' corresponds to LSP-1 */
45      MSB_flag;               /* Most significant bit of the last accepted packet */
46      rec_seq_num;            /* Least significant (N-1) bits out of N in-band bits */
47      last_seq_num_LSP-1;     /* Last sequence number received on LSP-1 */
48      last_seq_num_LSP-2;     /* Last sequence number received on LSP-2 */
```

FIG. 5B

```
49    Initial Values:
50
51        delay_counter = 0;
52        select_counter = 0;
53        LSP_flag = 0;
54        MSB_flag = 0;
55        last_seq_num_LSP-1 = 0;
56        last_seq_num_LSP-2 = 0;
57
58    Procedures:
59
60    • On receipt of a packet from any one of the two diverse LSPs {
61
62        ⇒ Check the most significant bit;
63
64        If (most significant bit is '0') {
65
66            If (MSB_flag == 1) {
67
68                ⇒ MSB_flag = 0;
69
70                If (packet is received from LSP-1) {
71                    ⇒ LSP_flag = 0;
72                    ⇒ last_seq_num_LSP-1 = rec_seq_num;
73                    ⇒ last_seq_num_LSP-2 = 0;
74                }
75                Else {
76                    ⇒ LSP_flag = 1;
77                    ⇒ last_seq_num_LSP-2 = rec_seq_num;
78                    ⇒ last_seq_num_LSP-1 = 0;
79                }
80
81                ⇒ select_counter = rec_seq_num + 1;
82                ⇒ delay_counter = rec_seq_num + 1;
83                ⇒ Accept the packet;
84
85            } /* If */
86            Else {         /* MSB_flag == 0 */
87
88                If (rec_seq_num < select_counter) {
89
90                    ⇒ Check if the packet is received from same LSP as indicated by
91                      the LSP flag;
92
93                    If (TRUE) {        /* First packet from the dual-feed */
94
95                        If (LSP_flag == 0) {
96                            ⇒ last_seq_num_LSP-1 = rec_seq_num;
97                            ⇒ last_seq_num_LSP-2 = 0;
98                        }
```

FIG. 5C

```
99              Else {
100                 ⇒ last_seq_num_LSP-2 = rec_seq_num;
101                 ⇒ last_seq_num_LSP-1 = 0;
102             }
103
104             ⇒ select_counter = rec_seq_num + 1;
105             ⇒ delay_counter = rec_seq_num + 1;
106             ⇒ Accept the packet;
107
108         } /* If: TRUE */
109
110         Else {        /* FALSE */
111
112             If (LSP_flag == 0) {    /* LSP-1 is the last LSP */
113
114                 ⇒ delay_counter - =rec_seq_num –
115                         last_seq_num_LSP-2;
116                 ⇒ last_seq_num_LSP-2 = rec_seq_num;
117             }
118             Else {                  /* LSP-2 is the last LSP */
119
120                 ⇒ delay_counter - =rec_seq_num –
121                         last_seq_num_LSP-1;
122                 ⇒ last_seq_num_LSP-1 = rec_seq_num;
123             }
124
125             ⇒ Drop the packet;
126         } /* Else: FALSE */
127     } /* If */
128
129     Else {        /* rec_seq_num >= select_counter */
130
131         ⇒ Check if the packet is received from same LSP as indicated by
132             the LSP flag;
133
134         If (TRUE) {
135             If (LSP_flag == 0) {
136                 ⇒ delay_counter += rec_seq_num –
137                         last_seq_num_LSP-1;
138                 ⇒ last_seq_num_LSP-1 = rec_seq_num;
139             }
140             Else {
141                 ⇒ delay_counter += rec_seq_num –
142                         last_seq_num_LSP-2;
143                 ⇒ last_seq_num_LSP-2 = rec_seq_num;
144             }
145
146             ⇒ select_counter = rec_seq_num + 1;
147             ⇒ Accept the packet;
148         }
```

FIG. 5D

```
149     Else {              /* FALSE */
150
151             If (packet received from LSP-1 && LSP_flag == 1) {
152
153                     If ((rec_seq_num – last_seq_num_LSP-1)
154                                             > delay_counter) {
155
156                             ⇒ delay_counter = (rec_seq_num –
157                                     last_seq_num_LSP-1) – delay_counter;
158                             ⇒ select_counter = rec_seq_num + 1;
159                             ⇒ last_seq_num_LSP-1 = rec_seq_num;
160                             ⇒ LSP_flag = 0;
161                             ⇒ Accept the packet;
162
163                     } /* If */
164                     Else {
165
166                             ⇒ delay_counter – = rec_sec_num –
167                                     last_seq_num_LSP-1;
168                             ⇒ last_seq_num_LSP-1 = rec_seq_num;
169                             ⇒ Drop the packet;
170
171                     } /* Else */
172             } /* If */
173             Else { /* packet received from LSP-2 && LSP_flag == 0 */
174
175                     If ((rec_seq_num – last_seq_num_LSP-2)
176                                             > delay_counter) {
177
178                             ⇒ delay_counter = (rec_seq_num –
179                                     last_seq_num_LSP-2) – delay_counter;
180                             ⇒ select_counter = rec_seq_num + 1;
181                             ⇒ last_seq_num_LSP-2 = rec_seq_num;
182                             ⇒ LSP_flag = 1;
183                             ⇒ Accept the packet;
184
185                     } /* If */
186                     Else {
187
188                             ⇒ delay_counter – = rec_sec_num –
189                                     last_seq_num_LSP-2;
190                             ⇒ last_seq_num_LSP-2 = rec_seq_num;
191                             ⇒ Drop the packet;
192
193                     } /* Else */
194             } /* Else */
195     } /* Else: FALSE */
196 } /* Else: rec_seq_num >= select_counter */
197 } /* Else: MSB_flag == 0 */
198 } /* If: most significant bit is '0' */
```

FIG. 5E

```
199    Else {            /* most significant bit is '1' */
200
201       ⇒ Check if the packet is received from the same LSP as indicated by the
202         LSP_flag;
203
204       If (TRUE) {
205
206            If (rec_seq_num < select_counter) {
207
208                 If (LSP_flag == 0) {     /* last packet from LSP-1 */
209
210                      ⇒ delay_counter += 2^{N-1} - last_seq_num_LSP-1 +
211                        rec_seq_num + 1;
212                      ⇒ last_seq_num_LSP-1 = rec_seq_num;
213
214                 } /* If */
215
216                 Else {                   /* last packet from LSP-2 */
217
218                      ⇒ delay_counter += 2^{N-1} - last_seq_num_LSP-2 +
219                        rec_seq_num + 1;
220                      ⇒ last_seq_num_LSP-2 = rec_seq_num;
221
222                 } /* Else */
223
224            } /* If */
225
226            Else {          /* rec_seq_num >= select_counter */
227
228                 ⇒ delay_counter += rec_seq_num - select_counter + 1;
229
230                 If (LSP_flag == 0) {
231                      ⇒ last_seq_num_LSP-1 = rec_seq_num;
232                 } /* If */
233                 Else {
234                      ⇒ last_seq_num_LSP-2 = rec_seq_num;
235                 } /* Else */
236
237            } /* Else */
238
239            ⇒ select_counter = rec_seq_num + 1;
240            ⇒ Accept the packet;
241
242            If (MSB_flag == 0) {
243                 ⇒ MSB_flag = 1;
244            } /* If */
245
246       } /* If: TRUE */
```

FIG. 5F

```
247     Else {      /* FALSE */
248
249         If (LSP_flag == 0) {
250
251             If (rec_seq_num < last_seq_num_LSP-2) {
252
253                 If (($2^{N-1}$ –last_seq_num_LSP-2+rec_seq_num+1)
254                                         > delay_counter) {
255
256                     ⇒ delay_counter = ($2^{N-1}$ –last_seq_num_LSP-2+
257                                    rec_seq_num+1) –delay_counter;
258                     ⇒ last_seq_num_LSP-2 = rec_seq_num;
259                     ⇒ select_counter = rec_seq_num + 1;
260                     ⇒ LSP_flag = 1;
261                     ⇒ Accept the packet;
262
263                 } /* If */
264
265                 Else {
266
267                     ⇒ delay_counter – = $2^{N-1}$ –last_seq_num_LSP-2
268                                        + rec_seq_num+1;
269                     ⇒ Drop the packet;
270
271                 } /* Else */
272             } /* If */
273
274             Else {      /* rec_seq_num ≥ last_seq_num_LSP-2 */
275
276                 If ((rec_seq_num - last_seq_num_LSP-2)
277                                         > delay_counter) {
278
279                     ⇒ delay_counter = (rec_seq_num -
280                             last_seq_num_LSP-2) – delay_counter;
281                     ⇒ last_seq_num_LSP-2 = rec_seq_num;
282                     ⇒ select_counter = rec_seq_num + 1;
283                     ⇒ LSP_flag = 1;
284                     ⇒ Accept the packet;
285
286                 } /* If */
287                 Else {
288
289                     ⇒ delay_counter – =rec_seq_num
290                                     –last_seq_num_LSP-2;
291                     ⇒ Drop the packet;
292
293                 } /* Else */
294             } /* Else */
295         } /* If: LSP_flag == 0 */
```

FIG. 5G

```
296        Else {        /* LSP_flag == 1 */
297
298            If (rec_seq_num < last_seq_num_LSP-1) {
299
300                If ((2^(N-1) – last_seq_num_LSP-1+rec_seq_num+1)
301                                                    > delay_counter) {
302
303                    ⇒ delay_counter = (2^(N-1) – last_seq_num_LSP-1+
304                                       rec_seq_num+1) – delay_counter;
305                    ⇒ last_seq_num_LSP-1 = rec_seq_num;
306                    ⇒ select_counter = rec_seq_num + 1;
307                    ⇒ LSP_flag = 0;
308                    ⇒ Accept the packet;
309
310                } /* If */
311
312                Else {
313
314                    ⇒ delay_counter – = 2^(N-1) – last_seq_num_LSP-1
315                                        + rec_seq_num+1;
316                    ⇒ Drop the packet;
317
318                } /* Else */
319            } /* If */
320            Else {
321
322                If ((rec_seq_num – last_seq_num_LSP-1)
323                                                > delay_counter) {
324
325                    ⇒ delay_counter = (rec_seq_num –
326                                       last_seq_num_LSP-1) – delay_counter;
327                    ⇒ last_seq_num_LSP-1 = rec_seq_num;
328                    ⇒ select_counter = rec_seq_num + 1;
329                    ⇒ LSP_flag = 0;
330                    ⇒ Accept the packet;
331
332                } /* If */
333
334                Else {
335
336                    ⇒ delay_counter – =rec_seq_num
337                                       – last_seq_num_LSP-1;
338                    ⇒ Drop the packet;
339
340                } /* Else */
341            } /* Else */
342        } /* Else */
343    } /* Else: FALSE */
344  } /* Else: most significant bit is '1' */
345 } END
```

FIG. 6A

```
1   Transmit Side:
2
3   Variables:
4
5       seq_1_counter;           /* N-1 bits counter to keep track of current
6                                   value of the outer sequence */
7       seq_2_counter;           /* N-1 bits counter to keep track of current
8                                   value of the inner sequence */
9       seq_1_insert_flag;       /* A value of 1 indicates that next packet
10                                  will carry number from outer sequence */
11
12  Initial Values:
13
14      seq_1_counter = 1;
15      seq_2_counter = 1;
16      seq_1_insert_flag = 0;
17
18  Procedure:
19
20      • On receipt of each packet that needs to be dual-fed {
21
22      If (seq_1_insert_flag == 1) {
23
24          ⇒ N-bit Sequence number to be carried in the header is constructed by
25             assigning '0' to the MSB and seq_1_counter to (N-1) LSBs;
26          ⇒ seq_1_counter += 1;
27          ⇒ seq_1_insert_flag = 0;
28
29      } /* If */
30
31      Else {
32
33          ⇒ N-bit Sequence number to be carried in the header is constructed by
34             assigning '1' to the MSB and seq_2_counter to (N-1) LSBs;
35          ⇒ seq_2_counter += 1;
36
37          If (seq_2_counter == 0) {
38              ⇒ seq_1_insert_flag = 1;
39          } /* Else */
40
41      } /* Else */
42
43          ⇒ Attach the header to the packet;
44          ⇒ Dual-feed the packet on two diverse LSPs;
45
46  } END
```

FIG. 6B

```
47   Receive Side:
48
49   Variables:
50
51
52        last_seq_1_frame_bit;      /* Next to the most significant bit from the last
53                                      accepted packet of outer sequence */
54        seq_1_select_counter;      /* Counter referring to the next sequence number
55                                      from the outer sequence. (N-2) bits counter */
56        seq_1_last_num_LSP-1;      /* Last number of outer sequence received on
57                                      LSP-1. (N-1) bits long. */
58        seq_1_last_num_LSP-2;      /* Last number of outer sequence received on
59                                      LSP-2. (N-1) bits long. */
60        seq_2_last_num_LSP-1;      /* Last number of inner sequence received on
61                                      LSP-1. (N-1) bits long */
62        seq_2_last_num_LSP-2;      /* Last number of inner sequence received on
63                                      LSP-2. (N-1) bits long. */
64
65
66   Initial Values:
67
68        last_seq_1_frame_bit = 0;
69        seq_1_select_counter = 1;
70        seq_1_last_num_LSP-1 = 0;
71        seq_1_last_num_LSP-2 = 0;
72        seq_2_last_num_LSP-1 = 0;
73        seq_2_last_num_LSP-2 = 0;
74
75
76   Definitions:
77
78        FrameBit;              /* FrameBit denotes the most significant bit of the N
79                                  in-band bits carried in the received packet */
80        Seq1FrameBit;          /* Given the in-band bits of the received packet is carrying
81                                  number from outer sequence, Seq1FrameBit denotes
82                                  next to the most significant bit of the N in-band bits */
83        Seq1RecNum;            /* Given the in-band bits of the received packet is carrying
84                                  number from outer sequence, Seq1RecNum denotes
85                                  least significant (N-2) bit of the N in-band bits */
86        Seq2RecNum;            /* Given the in-band bits of the received packet is carrying
87                                  number from outer sequence, Seq2RecNum denotes
88                                  least significant (N-1) bit of the N in-band bits */
89        (N-2)SeqLastNumLSP-1;  /* Denotes least significant (N-2) bits of last
90                                  number of outer sequence received on LSP-1 */
91        (N-2)Seq1LastNumLSP-2; /* Denotes least significant (N-2) bits of last
92                                  number of outer sequence received on LSP-1 */
93        Seq1LastFrameBitLSP-1; /* Denotes next to the most significant bit of last
94                                  number of outer sequence received on LSP-1 */
95        Seq1LastFrameBitLSP-2; /* Denotes next to the most significant bit of last
96                                  number of outer sequence received on LSP-2 */
```

FIG. 6C

```
97   Procedures:
98
99   • On receipt of a packet from any one of the two LSPs providing the platinum service {
100
101  If (FrameBit == 0) {           /* outer sequence packet */
102
103       If (Seq1FrameBit == last_seq_1_frame_bit) {
104
105            If (Seq1RecNum >= seq_1_select_counter) {
106
107                 ⇒ seq_1_select_counter = Seq1RecNum + 1;
108                 ⇒ Accept the packet;
109
110            }
111            Else {
112
113                 ⇒ Reject the packet;
114
115            } /* Else */
116
117       } /* If: Seq1FrameBit == last_seq_1_frame_bit */
118
119       Else {         /* Seq1FrameBit != last_seq_1_frame_bit */
120
121            If (Seq1RecNum < seq_1_select_counter) {
122
123                 ⇒ Update last_seq_1_frame_bit;       /*From 0/1 to 1/0 */
124                 ⇒ seq_1_select_counter = Seq1RecNum + 1;
125                 ⇒ Accept the packet;
126
127            } /* If */
128            Else {
129
130                 ⇒ Reject the packet;
131
132            } /* Else */
133
134       } /* Else: Seq1FrameBit != last_seq_1_frame_bit */
135
136       If (packet is received from LSP-1) {
137
138            seq_1_next_LSP-1 = Seq1RecNum;
139
140       } /* If */
141       Else {
142
143            seq_1_next_LSP-2 = Seq1RecNum;
144
145       } /* Else */
146  } /* If: frame_bit == 0 */
```

FIG. 6D

```
147     Else {       /* frame_bit == 1;   inner sequence packet */
148
149         If (packet is received from LSP-1) {
150
151             /* If outer sequence packet gets lost & subsequent inner sequence packet
152                 arrives. Outer sequence book-keeping needs to be updated reflecting
153                 as the outer sequence packet was received before the inner sequence
154                 packet. */
155
156             If (Seq2RecNum < seq_2_last_num_LSP-1) {
157
158                 If ((N-2)SeqLastNumLSP-1 == seq_1_select_counter) &&
159                         (Seq1LastFrameBitLSP-1 == last_seq_1_frame_bit)) {
160
161                     ⇒ seq_1_last_num_LSP-1 += 1;
162                     ⇒ seq_1_select_counter = (N-2)SeqLastNumLSP-1;
163                     ⇒ last_seq_1_frame_bit = Seq1LastFrameBitLSP-1;
164
165                 } /* If */
166
167                 Else {
168
169                     ⇒ seq_1_last_num_LSP-1 += 1;
170
171                 } /* If */
172
173             } /* If */
174
175             If (seq_1_last_num_LSP-1 == seq_1_last_num_LSP-2) {
176                 If (Seq2RecNum > seq_2_last_num_LSP-2) {
177
178                     ⇒ Accept the packet;
179
180                 } /* If */
181                 Else {
182
183                     ⇒ Reject the packet;
184
185                 } /* Else */
186
187                     ⇒ seq_2_last_num_LSP-1 = Seq2RecNum;
188
189             } /* If */
190             Else {
191                 If (Seq1LastFrameBitLSP-1 == last_seq_1_frame_bit) {
192
193                     If ((N-2)SeqLastNumLSP-1 >= seq_1_select_counter) {
194
195                         ⇒ Accept the packet;
196                     } /* If */
```

FIG. 6E

```
197            Else {
198
199                => Reject the packet;
200
201            } /* Else */
202
203            seq_2_last_num_LSP-1 = Seq2RecNum;
204
205        } /* If: Seq1LastFrameBitLSP-1 == last_seq_1_frame_bit */
206
207        Else {    /* Seq1LastFrameBitLSP-1 != last_seq_1_frame_bit */
208
209            If ((N-2)SeqLastNumLSP-1 < seq_1_select_counter) {
210
211                => Accept the packet;
212
213            } /* If */
214            Else {
215
216                => Reject the packet;
217
218            } /* Else */
219
220                => seq_2_last_num_LSP-1 = Seq2RecNum;
221
222        } /* Else */
223
224    } /* Else */
225
226 } /* If: packet is received from LSP-1 */
227
228 Else {    /* packet is received from LSP-2 */
229
230    If (Seq2RecNum < seq_2_last_num_LSP-2) {
231
232        If ((N-2)SeqLastNumLSP-2 == seq_1_select_counter) &&
233            (Seq1LastFrameBitLSP-2 == last_seq_1_frame_bit)) {
234
235            => seq_1_last_num_LSP-2 += 1;
236            => seq_1_select_counter = (N-2)SeqLastNumLSP-2;
237            => last_seq_1_frame_bit = Seq1LastFrameBitLSP-2;
238
239        } /* If */
240
241        Else {
242
243            => seq_1_last_num_LSP-2 += 1;
244
245        } /* If */
246    } /* If */
```

FIG. 6F

```
247         If (seq_1_last_num_LSP-1 == seq_1_last_num_LSP-2) {
248             If (Seq2RecNum > seq_2_last_num_LSP-1) {
249
250                 ⇒ Accept the packet;
251
252             } /* If */
253             Else {
254
255                 ⇒ Reject the packet;
256
257             } /* Else */
258
259                 ⇒ seq_2_last_num_LSP-2 = Seq2RecNum;
260
261         } /* If */
262         Else {
263             If (Seq1LastFrameBitLSP-2 == last_seq_1_frame_bit) {
264                 If ((N-2)SeqLastNumLSP-2 >= seq_1_select_counter) {
265
266                     ⇒ Accept the packet;
267
268                 } /* If */
269                 Else {
270
271                     ⇒ Reject the packet;
272
273                 } /* Else */
274
275                     ⇒ seq_2_last_num_LSP-2 = Seq2RecNum;
276
277             } /* If: Seq1LastFrameBitLSP-2 == last_seq_1_frame_bit */
278
279             Else {    /* Seq1LastFrameBitLSP-2 != last_seq_1_frame_bit */
280                 If ((N-2)SeqLastNumLSP-2 < seq_1_select_counter) {
281
282                     ⇒ Accept the packet;
283
284                 } /* If */
285                 Else {
286
287                     ⇒ Reject the packet;
288
289                 } /* Else */
290
291                     ⇒ seq_2_last_num_LSP-2 = Seq2RecNum;
292             } /* Else */
293         } /* Else */
294     } /* If: packet is received from LSP-2 */
295 } /* Else */
296 } END
```

SEQUENCE NUMBER SCHEMES FOR ACCEPTANCE/REJECTION OF DUPLICATED PACKETS IN A PACKET-BASED DATA NETWORK

CROSS-REFERENCE TO REPLATED APPLICATIONS

The subject matter of this application is related to U.S. patent application Ser. No. 09/687,348 (the '348 application), filed Oct. 12, 2000, the teachings of which are incorporated herein by reference.

BACKGROUND OF THE INVENTION

1. Field of the Invention

The present invention relates to communications systems and other data networks that rely on packet-based transport mechanisms.

2. Description of the Related Art

FIG. 1 shows a portion of an exemplary data network 100 that relies on a packet-based transport mechanism to transmit data between pairs of nodes in the network. In particular, FIG. 1 shows four nodes labeled A, B, C, and D connected by five links labeled L1, L2, L3, L4, and L5. For data transmissions from Node A to Node C, Node A may be referred to as the source node and Node C as the destination node, although Node A might not be the origin of the packet and/or Node C might not be the ultimate destination for the packet. In general, data at Node A that is to be transmitted to Node C is segmented into one or more different packets, where the packets are routed to Node C along one or more of the four available paths between Nodes A and C (i.e., the paths (A→B→C), (A→D→C), (A→B→D→C), and (A→D→B→C)). In one possible implementation of data network 100, all of the packets for a given transmission are transmitted along the same path. In another possible implementation, the packets may be (e.g., randomly) transmitted along two or more different paths. Since the time that it takes for a packet to travel from the source node to the destination node will typically vary from path to path, it is possible for packets to arrive at the destination node out of order (i.e., an earlier-transmitted packet arriving at the destination node after a later-transmitted packet). In some applications, packets are buffered at the destination node in an attempt to reconstruct the correct packet sequence when packets arrive out of order. In addition, in some data networks, it is possible for one or more packets to be lost during transit between the source and destination nodes, where those lost packets never arrive at the destination node. In general, the destination node needs to be configured to implement an algorithm that dictates how incoming packets are to be handled (e.g., when to discard packets as being too old).

SUMMARY OF THE INVENTION

The present invention is related to techniques for handling data packets received at a destination node from a source node of a packet-based data network, so that the data in the packets can be further processed (e.g., transmitted to appropriate customers). In accordance with the principles of the present invention, in the source node, packets are duplicated and a unique, but identical sequence number is inserted into each copy of the duplicated packet, where the two copies are transmitted along two different paths from the source node to the destination node. Depending on the implementation, the source node inserts different types of sequence numbers as identifiers, and the destination node processes those sequence numbers accordingly to determine whether to accept or reject each received packet. In accordance with an aspect of the invention, the number of sequence bits allocated to each packet may be smaller than the size of the effective sequence number for the packet as interpreted by the destination node.

In one embodiment, the present invention is a method for transmitting packets. According to this embodiment, first and second duplicate packets are created from an original packet in a source node. A sequence number is inserted into the first and second duplicate packets. The first and second duplicate packets are transmitted along respective different paths towards a destination node. A bit in each of the first and second duplicate packets identifies whether duplicate packet transmission was initiated within a specific period of time.

According to another embodiment for transmitting packets, first and second duplicate packets are created from an original packet, and a sequence number is inserted into the first and second duplicate packets. The first and second duplicate packets are transmitted along respective different paths towards a destination node. A bit in each of the first and second duplicate packets identifies whether the sequence number is an inner sequence number or an outer sequence number, wherein a specified number of inner sequence packets are transmitted between each consecutive pair of outer sequence packets.

In another embodiment, the present invention is a method for processing received packets. According to this embodiment, a sliding window is maintained based on a sequence number of a previously accepted packet. A current packet is received via either a first path or a second path, and it is determined whether the sequence number of the current packet falls within the sliding window. The current packet is accepted, when the sequence number of the current packet falls within the sliding window.

According to another embodiment for processing received packets, a current packet is received via either a first path or a second path. A first least significant bit (LSB) counter and a first most significant bit (MSB) counter are maintained for the first path, and a second LSB counter and a second MSB counter are maintained for the second path. It is identified whether the current packet has been received via the first path or the second path. The sequence number in the current packet is interpreted as an LSB sequence number, and a full sequence number is generated by concatenating the current LSB sequence number with a corresponding MSB counter value. The full sequence number is compared to a full sequence number of a previously accepted packet, for example, to determine whether to accept or reject the current packet. An MSB counter keeps track of the one or more MSBs of the full sequence number that are not explicitly represented by the sequence numbers contained in the packets. An MSB counter is incremented when a roll-over of the corresponding LSB counter value (e.g., a transition from all ones to all zeros) is detected.

According to another embodiment for processing received packets, a current packet is received via either a first path or a second path, and tracking is performed for which path is the leading path (i.e., the path over which the first of a pair of duplicated packets arrives at the destination node) and which path is the trailing path (i.e., the path over which the second duplicated packet arrives). The current packet is accepted, when the current packet was received from the leading path. The current packet is rejected, when the current packet was received from the trailing path.

According to another embodiment for processing received packets, a current packet is received via either a first path or a second path. A bit in the current packet identifies whether the sequence number is an inner sequence number or an outer sequence number, wherein a specified number of inner sequence packets are transmitted between each consecutive pair of outer sequence packets. It is identified which inner sequence packets are associated with which outer sequence packets. A sequence number in the current packet is compared to the inner and outer sequence numbers associated with the previously accepted packet to determine whether to accept the current packet. For example, in one implementation, following each outer sequence packet, a sequence of inner sequence packets is transmitted along the first and second paths with sequence numbers starting at all zeros and increasing monotonically to all ones. In this case, at the destination node, after each outer sequence packet is received, those inner sequence packets forming a sequence having monotonically increasing sequence numbers are associated with that outer sequence number.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 presents pseudo-code for a first sliding window algorithm, according to one embodiment of the present invention;

FIG. 3 presents pseudo-code for a second sliding window algorithm, according to another embodiment of the present invention;

FIG. 4 presents pseudo-code for a receiver-based counting algorithm, according to another embodiment of the present invention;

FIG. 5 presents pseudo-code for a delay counter-based algorithm, according to another embodiment of the present invention; and FIG. 6 presents pseudo-code for a dual-sequence number algorithm, according to another embodiment of the present invention.

DETAILED DESCRIPTION

Figure 1:
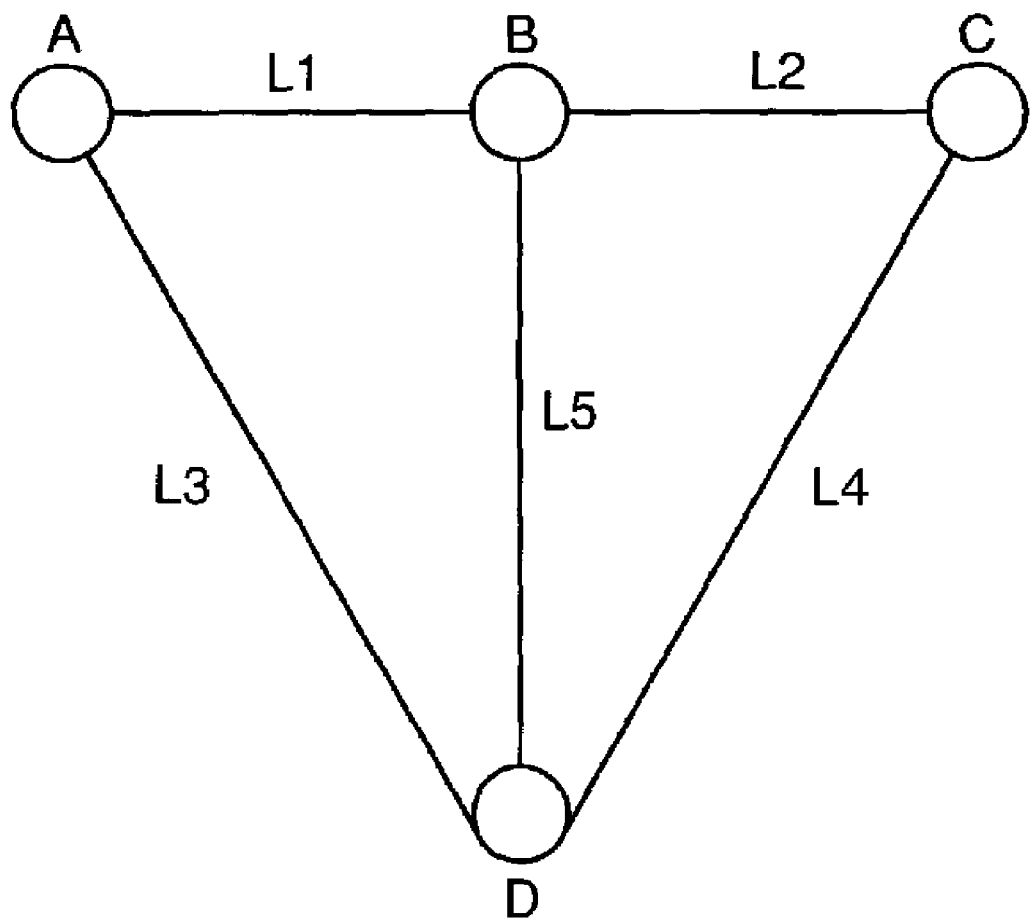
FIG. 1 shows a portion of an exemplary data network that relies on a packet-based transport mechanism to transmit data between pairs of nodes in the network.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

The '348 application describes a transport protocol for a packet-based data network in which each packet of data to be transmitted from a source node to a destination node within the data network is duplicated at the source node, where the two copies of each data packet are transmitted in parallel along two different paths between the source and destination nodes. For example, in the exemplary data network of FIG. 1, data packets to be transmitted from Node A to Node C may be duplicated at Node A, where one stream of data packets is transmitted along the path (A→B→C), while the other stream of duplicate data packets is transmitted along the path (A→D→C).

According to the '348 application, in order for the destination node to reconstruct a non-redundant version of the original data stream from two streams of received data packets, the source node inserts a sequence number into each packet, where each pair of duplicated packets is assigned the same sequence number. The destination node maintains a sequence number counter whose value is equal to the sequence number of the next expected packet. If the sequence number of the next received data packet is less than the value of the destination node's sequence number counter, then the data packet is discarded. If the packet's sequence number is equal to or greater than the counter value, then the packet is retained and the value of the sequence number counter is updated to the sequence number of the next expected packet (i.e., one more than the current packet's sequence number). This processing is intended to ensure that the data stream reconstructed at the destination node from the two streams of duplicated data packets is non-redundant.

One of the applications of the invention described in the '348 application is in the area of restoration processing in the event of a failure of a link or a node in a data network. Referring again to data network 100 of FIG. 1, assume that, according to the '348 application, data packets are duplicated at Node A and transmitted in parallel along the paths (A→B→C) and (A→D→C) to Node C, where the transmission time for the path (A→D→C) is longer than the transmission time for the path (A→B→C). Assume further that, although packets may be lost during transit, those packets that are transmitted along a single path cannot arrive out of order at the destination node. In that case, due to the different transmission times, each packet that travels along the path (A→B→C) will typically arrive at Node C prior to its corresponding duplicate packet that travels along the path (A→D→C) (assuming that that duplicate packet is not lost in transit). Typically, then, during normal processing, Node C will select all of the packets that arrive along the path (A→B→C) and discard all of the packets that arrive along the path (A→D→C). (Note that, as long as the difference in transmission times between the two paths is sufficient great and the rate of packet loss is sufficiently low, even if a packet is lost in transit along the path (A→B→C), the corresponding duplicate packet will probably be too old to be selected if and when it eventually arrives at Node C along the path (A→D→C).)

If, however, a failure occurs in the path (A→B→C) (e.g., Link L1 or L2 is cut or Node B stops working), then, within a relatively short period of time (i.e., corresponding to the difference in transmission times between the two paths), Node C will start to select packets arriving along the path (A→D→C), thereby providing relatively fast restoration processing for network 100 with no—or at least minimal—loss of data (and without having to buffer any data at Node C).

Typically, sequence numbers are inserted into a particular data field in the data packets, where the data field is of finite length. As such, there is a limit to the number of different unique sequence numbers that can be inserted into the data packets. For example, where data packets contain binary data, a sequence number data field having N bits is capable of representing $2^N$ different sequence numbers. For continuous or relatively large data streams (i.e., data streams having more than $2^N$ packets), the sequence numbers for those data packets will not all be unique. In a typical situation, the source node assigns sequence numbers incrementally with values from 0 (i.e., a binary value of all zeros in the sequence number data field) to $2^N-1$ (i.e., a binary value of all ones in the sequence number data field). After the sequence number corresponding to the value $2^N-1$ is used, the next sequence number value will roll over to 0 starting the incremental sequence all over again.

Special care is needed to handle the wrap-around situation where the sequence numbers roll over from $2^N-1$ to 0. Without special care, the simple selection mechanism (as described above) may wrongfully reject or accept packets. For example, if the receiver receives a packet with sequence number "0" immediately after receiving a packet with sequence number $2^N-2$ (that is, packet $2^N-1$ is dropped), then it will wrongfully drop the packet because its sequence number is less than the value $2^N-1$ in the counter. Also, just after a proper wrap-around of the value in the counter, a receiver can receive a higher sequence number from the longer (i.e., trailing) path which the simple select function will wrongfully accept rather than reject.

Sliding Window Methods

A destination node may implement a sliding window algorithm to determine whether to accept or reject each received data packet. According to sliding window algorithms, the destination node accepts a data packet if its sequence number is from the specified set of acceptable sequence numbers (i.e., the sequence number is inside a specified window) and, otherwise, rejects the data packet, where the set of acceptable sequence numbers is updated (i.e., the window slides) whenever a data packet is accepted.

The size of the window should be larger than the expected maximum number of consecutive packets that can be lost along a working data path, but smaller than the number of different sequence numbers (i.e., $2^N$). In general, when N bits are available for carrying the sequence number, the sliding window scheme will work properly if the sum of the maximum number of packets that a working data path can lose and the maximum number of sequence numbers that the slower data path can fall behind is less than or equal to $2^N$.

Sliding Window Algorithm #1

FIG. 2 presents pseudo-code for a first sliding window algorithm, according to one embodiment of the present invention. The processing involved in this algorithm is described in the context of four different exemplary cases: (A) nominal (i.e., no lost packets) processing not involving sequence-number roll-over; (B) processing when a packet is lost, but not involving sequence-number roll-over, (C) nominal processing involving sequence-number roll-over, and (D) processing when a packet is lost and involving sequence-number roll-over. Each of these cases is for an exemplary scenario in which five bits in each packet are used to represent incrementally increasing sequence numbers (i.e., from 0 to 31, followed by a roll-over back to 0), where the size of the window (window_sz) is 10, corresponding to a set of eleven different sequence numbers (i.e., from the next expected sequence number (select_counter) to (select_counter+window_sz)). Note that, in an alternative implementation, the window size may refer to the number of different sequence numbers in the window, i.e., from select_number to select_number+window_sz−1. Furthermore, although the present invention is described in the context of examples in which N=5 bits are used in each data packet for the sequence number, in theory, the present invention can be applied to any other number of bits per packet for representing sequence numbers.

Assume further that the difference in transmission time between the two paths for the duplicated packet streams corresponds to six packets. This means that, on average, the second copy of each data packet will arrive at the destination node via the slower path about six packets after the corresponding first copy arrived via the faster path. This means that, in general, the destination node will receive data packets via the faster path having sequence numbers that are about 6 greater than the sequence numbers of packets received at about the same time at the destination node via the slower path (taking into account sequence-number roll-over). In other words, the data packet having a sequence number of (x+6) is received at the destination node via the faster path at about the same time that the destination node receives the data packet having a sequence number of (x) via the slower path.

Case A: Nominal Processing

As an example of Case A, assume that the sequence number of the next expected packet (select_counter) is 9, which means that the current sliding window extends from 9 (i.e., select_counter) to 19 (i.e., select_counter+window_sz). Under nominal operating conditions (i.e., no lost packets), the next packet received via the faster path will have a sequence number of rec_seq_no=9, while the next packet received via the slower path will have a sequence number of rec_seq_no=3.

If the next packet is received via the faster path, then rec_seq_no=9, and Lines 19-20 of FIG. 2 will determine that rec_seq_no is inside the current sliding window of (9 to 19). As such, Line 24 will accept the packet, and Line 25 will set select_counter to 10 for the next received packet.

If, instead, the next packet is received via the slower path, then rec_seq_no=3, and Lines 19-20 will determine that rec_seq_no is outside the current sliding window of (9 to 19), causing Line 21 to reject the packet. (Note that the duplicate copy of the rejected packet having rec_seq_no=3 would nominally have been received via the faster path and accepted by the destination node 6 packets earlier. As such, in this example, no unique data is lost by rejecting the packet in Line 21.)

In either case, the received packet is handled appropriately.

Case B: Processing with Lost Packet

The example for Case B is based on the same assumptions as for Case A, except that, for some reason, the next expected packet (i.e., the packet transmitted over the faster path having sequence number 9) is lost during transmission from the source node to the destination node.

In that case, if the next packet is received via the faster path, then rec_seq_no=10, and Lines 19-20 will determine that rec_seq_no is inside the current sliding window of (9 to 19). As such, Line 24 will accept the packet, and Line 25 will set select_counter to 11 for the next received packet. Note that the option exists to implement a destination node with the ability to buffer one or more packets. In this case, data corresponding to the lost packet can be recovered from the corresponding duplicate packet if and when it eventually arrives at the destination node via the slower path.

If, instead, the next packet is received via the slower path, then rec_seq_no=4, and Lines 19-20 will determine that rec_seq_no is outside the current sliding window of (9 to 19), causing Line 21 to reject the packet. (Note that the other copies of both the lost packet and the rejected packet would nominally have been received and accepted by the destination node 6 packets earlier.)

In either case, the received packet is handled appropriately.

Case C: Nominal Wrap-Around Processing

As an example of Case C, assume that the sequence number of the next expected packet (select_counter) is 31, which means that the current sliding window extends from 31 (i.e., select_counter) back to 0 and then to 9 (i.e., select_counter+window_sz taking into account sequence-number roll-over). Under nominal operating conditions (i.e., no lost packets), the next packet received via the faster path will have a sequence number of rec_seq_no=31, while the next packet received via the slower path will have a sequence number of rec_seq_no=25.

If the next packet is received via the faster path, then rec_seq_no=31, and Lines 19-20 of FIG. 2 will determine that rec_seq_no is inside the current sliding window of (31 to 9). As such, Line 24 will accept the packet, and Line 25 will set select_counter to 0 for the next received packet, taking into account the roll-over of the sequence number.

If, instead, the next packet is received via the slower path, then rec_seq_no=25, and Lines 19-20 will determine that rec_seq_no is outside the current sliding window of (31 to 9), causing Line 21 to reject the packet. (Note that the other copy of the rejected packet would nominally have been received and accepted by the destination node 6 packets earlier.)

In either case, the received packet is handled appropriately.

Case D: Wrap-Around Processing with Lost Packet

The example for Case D is based on the same assumptions as for Case C, except that, for some reason, the next expected packet is lost during transmission from the source node to the destination node.

In that case, if the next packet is received via the faster path, then rec_seq_no=0, and Lines 19-20 will determine that rec_seq_no is inside the current sliding window of (31 to 9). As such, Line 24 will accept the packet, and Line 25 will set select_counter to 1 for the next received packet.

If, instead, the next packet is received via the slower path, then rec_seq_no=26, and Lines 19-20 will determine that rec_seq_no is outside the current sliding window of (31 to 9), causing Line 21 to reject the packet. (Note that the other copies of both the lost packet and the rejected packet would nominally have been received and accepted by the destination node 6 packets earlier.)

In either case, the received packet is handled appropriately.

Sliding Window Algorithm #2

FIG. 3 presents pseudo-code for a second sliding window algorithm, according to another embodiment of the present invention. The processing involved in this algorithm is described in the context of the same four different exemplary cases as for the first sliding window algorithm of FIG. 2. As before, each of these cases is for a scenario in which N=5 bits in each packet are used to represent incrementally increasing sequence numbers (i.e., from 0 to 31, and then back to 0), where the difference in transmission time between the faster and slower paths for the duplicated packet streams corresponds to 6 packets.

Case A: Nominal Processing

As an example of Case A, assume that the sequence number of the last accepted packet is 8, which is represented by the binary value (01000), and the sequence number of the next expected packet is 9, which is represented by the binary value (01001). As such, according to Lines 6-7 of FIG. 3, last_frame_bit is 0, and, according to Lines 10-11, select_counter is (1001) or 9. Under nominal operating conditions (i.e., no lost packets), the next packet received via the faster path will have a sequence number of 9 or (01001), while the next packet received via the slower path will have a sequence number of 3 or (00011).

If the next packet is received via the faster path, then, according to Lines 4-5, frame_bit is 0, and, according to Lines 8-9, rec_seq_no is (1001) or 9. In that case, Line 25 will determine that frame_bit is equal to last_frame_bit, and Line 26 will determine that rec_seq_no is greater than or equal to select_counter, causing Line 27 to accept the packet, and Line 28 to set the counter value to 10 for the next received packet.

If, instead, the next packet is received via the slower path, then, according to Lines 4-5, frame_bit is 0, and, according to Lines 8-9, rec_seq_no is (0011) or 3. In that case, Line 25 will determine that frame_bit is equal to last_frame_bit, and Line 26 will determine that rec_seq_no is not greater than or equal to select_counter, causing Line 31 to reject the packet. (Note that the other copy of the rejected packet would nominally have been received and accepted by the destination node 6 packets earlier.)

In either case, the received packet is handled appropriately.

Case B: Processing with Lost Packet

The example for Case B is based on the same assumptions as for Case A, except that, for some reason, the next expected packet is lost during transmission from the source node to the destination node.

In that case, if the next packet is received via the faster path, then the sequence number of the received packet is 10 or (01010), in which case, according to Lines 4-5, frame_bit is 0, and, according to Lines 8-9, rec_seq_no is (1010) or 10. In that case, Line 25 will determine that frame_bit is equal to last_frame_bit, and Line 26 will determine that rec_seq_no is greater than or equal to select_counter, causing Line 27 to accept the packet, and Line 28 to set the counter value to 11 for the next received packet.

If, instead, the next packet is received via the slower path, then rec_seq_no=4 or (00100), in which case, according to Lines 4-5, frame_bit is 0, and according to Lines 8-9, rec_seq_no is (0100) or 4. In that case, Line 25 will determine that frame_bit is equal to last_frame_bit, but Line 26 will determine that rec_seq_no is not greater than or equal to select_counter, causing Line 31 to reject the packet. (Note that the other copies of both the lost packet and the rejected packet would nominally have been received and accepted by the destination node 6 packets earlier.)

In either case, the received packet is handled appropriately.

Case C: Nominal Wrap-Around Processing

As an example of Case C, assume that the sequence number of the last accepted packet is 30, which is represented by the binary value (11110), and the sequence number of the next expected packet is 31, which is represented by the binary value (11111). As such, according to Lines 6-7 of FIG. 3, last_frame_bit is 1, and, according to Lines 10-11, select_counter is (1111) or 15. Under nominal operating conditions (i.e., no lost packets), the next packet received via the faster path will have a sequence number of 31 or (11111), while the next packet received via the slower path will have a sequence number of 25 or (11001).

If the next packet is received via the faster path, then, according to Lines 4-5, frame_bit is 1, and, according to Lines 8-9, rec_seq_no is (1111) or 15. In that case, Line 25 will determine that frame_bit is equal to last_frame_bit, and Line 26 will determine that rec_seq_no is greater than or equal to select_counter, causing Line 27 to accept the packet, and Line 28 to set the counter value to 0 for the next received packet, taking into account sequence-number roll-over.

If, instead, the next packet is received via the slower path, then, according to Lines 4-5, frame_bit is 1, and, according to Lines 8-9, rec_seq_no is (1001) or 9. In that case, Line 25 will determine that frame_bit is equal to last_frame_bit, and Line 26 will determine that rec_seq_no is not greater than or equal to select_counter, causing Line 31 to reject the packet. (Note that the other copy of the rejected packet would nominally have been received and accepted by the destination node 6 packets earlier.)

In either case, the received packet is handled appropriately.

Case D: Wrap-Around Processing with Lost Packet

The example for Case D is based on the same assumptions as for Case C, except that, for some reason, the next expected packet is lost during transmission from the source node to the destination node. In that case, the next packet received via the faster path will have a sequence number of 0 or (00000), while the next packet received via the slower path will have a sequence number of 26 or (11010).

If the next packet is received via the faster path, then, according to Lines 4-5, frame_bit is 0, and, according to Lines 8-9, rec_seq_no is (0000) or 0. In that case, Line 25 will determine that frame_bit is not equal to last_frame_bit, and Line 34 will determine that rec_seq_no is less than select_counter, causing Line 35 to set last_frame_bit to 0 for the next received packet, Line 36 to accept the packet, and Line 37 to set the counter value to 1 or (00001) for the next received packet.

If, instead, the next packet is received via the slower path, then, according to Lines 4-5, frame_bit is 1, and, according to Lines 8-9, rec_seq_no is (1010) or 10. In that case, Line 25 will determine that frame_bit is equal to last_frame_bit, and Line 26 will determine that rec_seq_no is not greater than or equal to select_counter, causing Line 31 to reject the packet. (Note that the other copy of the rejected packet would nominally have been received and accepted by the destination node 6 packets earlier.)

In either case, the received packet is handled appropriately.

Behavior Upon Repair

Another important aspect of the sliding window scheme is its handling of failure and repair scenarios. In case of a failure in the network, unless either the ingress or egress node gets failed, only one of the diverse paths (also referred to as a label switched paths (LSPs)) will be affected. The surviving LSP will continue delivering packets. If the surviving LSP is the leading LSP, then the select function will continue to accept packets from it. If, however, the surviving LSP is the trailing LSP, then the select function rejects packets until it sees a packet whose sequence number falls within the sliding window. Note that the rejected packets will correspond to duplicate packets that will have already been delivered and accepted before the leading LSP failed.

Until the failed LSP gets repaired, only one LSP is available to deliver packets. The ingress node continues sending packets on the surviving LSP (say LSP-1) with sequence numbers as before. The egress node also continues working as before the failure, that is, accepting packets based on the select counter value and incrementing the counter after accepting each packet. In a "reverted restoration mode," when the failed LSP (say LSP-2) is restored, the first dual-fed packet gets the next sequence number, i.e., next to the one assigned to the last packet fed only on LSP-1 before the repair of LSP-2.

Assume that the sequence number assigned to the first dual-fed packet is y. Further, assume that the value in the select counter is x at the time when first packet is dual-fed after the repair of the failed LSP (that is, LSP-2). This means that there are (y−x) packets ahead of the first dual-fed packet in the survived LSP (that is, LSP-1). Given this, the question is: from which LSP (LSP-1 or LSP-2) will the select counter first receive the packet with sequence number y?

If the select counter receives the packet with sequence number y first from LSP-1, then LSP-2 will trail behind and the receive counter will continue accepting packets from LSP-1. Note that, in this case, no packets are lost due to the repair of LSP-2.

The other possibility is that the select counter receives the packet with sequence number y first from LSP-2. Note that, before receiving the first dual-fed packet on LSP-2, the select counter was accepting packets from LSP-1 (i.e., the only LSP available after the failure). Therefore, the value in the select counter was one more than the sequence number of the last packet accepted when the packet with sequence number y showed up from LSP-2. Assume that, at the instant when the packet with sequence number y is received from LSP-2, the value in the select counter is z, where x≦z≦y. Depending on the difference between (y−z), two scenarios are possible:

1) Most likely scenario: If (y−z≦size of the sliding window), then the packet with sequence number y from LSP-2 will be accepted and the select counter window will be incremented to the value (y+1). Note that, as a consequence, packets with sequence numbers between z and (y−1) from LSP-1 will be lost.

2) Very unlikely scenario: Otherwise, the packet with sequence number y from LSP-2 will be rejected since it fell out of the acceptable window. As a consequence, even if LSP-2 is receiving packets with higher sequence numbers than those in LSP-1, LSP-2 will trail behind LSP-1. (That is, an LSP that should be ahead starts trailing behind). Theoretically this can happen, but it is extremely unlikely. (Note that packet with sequence number y on LSP-2 has to get ahead of its duplicate on LSP-1 by more than the acceptable window size which should be more than the consecutive packet losses on an LSP). Consider the consequence of such an event. If LSP-1 catches up, so that the select counter receives a packet from LSP-2 with a sequence number within the acceptable window, then LSP-1 will start trailing, which is desirable, at a cost of losing no more packets than the acceptable window size. Otherwise, the select function continues accepting packets from LSP-1 without any affect (problem) until another failure happens. When another failure happens, then, in case of failure of LSP-2, no packets are lost, whereas, in case of failure of LSP-1, packets more than the acceptable window size but less than the maximum number of packets an LSP can fall behind will be lost.

Transparent Sequence Number Methods

As described above, the sliding window methods described in the previous sections work properly when N bits are available for carrying the sequence number, where the sum of the maximum number of packets that a working data path can lose and the maximum number of sequence numbers that the slower data path can fall behind is less than or equal to $2^N$. In some applications, this condition might not be satisfied. For example, it may be that only P<N bits are available in each data packet. In that case, a transparent sequence number algorithm may be implemented.

In a transparent sequence number algorithm, the destination node maintains a sequence number having more bits (N) than the number of bits (P) available in each data packet for representing sequence numbers, where both packets in each duplicated pair have the same P-bit value.

Receiver-Based Counting Algorithm

FIG. 4 presents pseudo-code for a receiver-based counting algorithm, according to another embodiment of the present invention. According to this algorithm, the sender (i.e., the source node) and the receiver (i.e., the destination node) both maintain full N-bit sequence number counter, but the sender only includes the P least significant bits (LSBs) of the full sequence number in each data packet that is duplicated and transmitted along the two different data paths (Lines 2-5 of FIG. 4) The receiver maintains sequence number counters for each different data path. In particular, for each data path i, the receiver maintains a P-bit LSB sequence number counter $m\_i$ of the next expected data packet from data path i as well as a Q-bit most significant bit (MSB) sequence number counter (also referred to as the cycle number cycle_i), where N=P+Q (Lines 8-10). When the channel between the source node and the destination node is established, the cycle numbers cycle_i are both initialized to 0 (Lines 12-13).

When the receiver receives a data packet from data path i, the receiver compares the P-bit sequence number z_i with the P-bit LSB sequence number counter m_i for data path i to detect roll-over of the P-bit LSB sequence numbers, in which case the Q-bit MSB sequence number cycle_i needs to be updated (Lines 16-19). (Note that this algorithm assumes that data packets that are transmitted over the same data path cannot arrive at the destination node out of order. Data packets may be lost, but the transmission order is preserved. As with the sliding window algorithms, this algorithm can be modified (e.g., by adding buffering at the receiver) to allow at least some out-of-order reception of data packets from the same data path.) The receiver then generates the full N-bit sequence number f_i for the received data packet for used by the selector by pre-pending the Q-bit cycle number cycle_i to the P-bit LSB sequence number m_i (Lines 21-22).

The selector, which is also implemented in the destination node, maintains a full N-bit sequence number F corresponding to full sequence number of the last accepted data packet (from either data path) (Line 25). The selector compares that full N-bit sequence number F with the constructed full sequence number f_i for the current data packet to determine whether to accept or reject the data packet (Lines 27-33). If f_i is less than or equal to F, then the data packet is discarded as too old. Unless the corresponding duplicate data packet was lost in transit, that duplicate data packet would have already been accepted by the selected during a previous processing cycle. Otherwise, f_i is greater than F, in which case, the data packet is accepted and F is updated to the value of f_i for use during the next processing cycle.

Note that, except for infinitely long data streams, an appropriate selection of Q for the size of the MSB cycle counter will effectively avoid the problem of ambiguous (i.e., non-unique) sequence numbers, as long as there are no more than $2^P$ consecutive lost packets in any data path.

Delay Counter-Based Algorithm

One scheme for keeping track of how far ahead (or behind) an LSP can proceed (or fall) is to use a one-bit LSP flag in the transmitted sequence number and a local delay counter at the receiver consisting of Q bits, where $2^Q$ is greater than the maximum number of packets by which an LSP can either lead or trail another LSP. The LSP flag will keep track of which among the two LSPs is ahead, while the delay counter keeps track of the number of packets by which the leading LSP is ahead of the trailing LSP.

Given the LSP flag and the delay counter, when a packet arrives, its LSP flag is checked to determine if the packet belongs to the leading LSP. If the packet belongs to the leading LSP, then it gets accepted and the values of the select and delay counters are updated. The next value for the select counter is calculated by adding one to the sequence number of the received packet. The value of the delay counter is updated by adding the difference between sequence numbers of the current received packet and the last received packet from the leading LSP to the current value of the delay counter.

When a packet from the trailing LSP arrives at the receiver, the difference between the sequence numbers of the current received packet and the last received packet on the trailing LSP is calculated. If the calculated difference value is greater than the current value of the delay counter, then the received packet is accepted and the delay counter is updated based on the difference between the calculated difference value and the current delay counter value. Further, the LSP flag is updated to reflect the change in the leading LSP. Otherwise, the received packet gets rejected and the delay counter is updated by subtracting the calculated difference value from the current delay counter value.

Using an LSP flag and a delay counter enables relaxing of the constraint on the number of bits required to carry the sequence number in each packet in order to avoid rejection or acceptance of wrong packets. Instead of satisfying the condition $N \geq P+Q$, it is now sufficient that $N>P$, where N is the number of available bits in each packet to carry the sequence number, P is the maximum number of consecutive losses an LSP can experience, and Q is the maximum number of packets by which the trailing LSP can fall behind.

As discussed above, any legitimate select scheme should be able to gracefully recover from an LSP failure. Consider the scenario when one LSP (e.g., LSP-2) from a pair of LSPs (LSP-1 and LSP-2) fails due to failure in the network. In this case, the receiver will be receiving and accepting packets only from LSP-1. The delay counter will eventually reach its maximum value, but that should not impact the operation until the failed LSP gets repaired.

After the repair of the failed LSP (LSP-2), the delay counter must again start tracking the number of packets that the leading LSP is ahead of the trailing LSP. The receiver should be able to realize receipt of the first dual-fed packet from either LSP. If the copy of the first dual-fed packet is received from the survived LSP (LSP-1), it will be accepted, but, if the receiver does not realize that this is the arrival of the first packet, then, at the arrival of its duplicate from the repaired LSP, the receiver would not be able to correct the estimate of how many packets LSP-1 is ahead of LSP-2. The reason is that, by the time the duplicate copy arrives on LSP-2, LSP-1 can be ahead by more packets than the sequence numbers that the available bits in the packet can track.

Indication about the start of feeding of traffic on both LSPs (LSP-1 and LSP-2) after the failed LSP is repaired, can be passed to the receiver using one of the available in-band bits in the following manner. According to certain embodiments of the present invention, an addition is made to the scheme based on the LSP flag and delay counter, so that the start of feeding on both LSPs can be indicated. The addition is based on using the most significant bit from the available in-band bits. This will reduce the number of available bits to transmit the sequence number by one. In other words, from N available bits in each packet, (N−1) bits will be used to transmit the sequence number.

A value of "0" in the most significant bit will indicate the start of feeding of traffic on both LSPs. The sequence number on the first dual-feed packet that comprises one fewer bit from the available in-band bits is also initialized to "0. " Like before, the sequence number of each subsequent packet is computed by adding one to the sequence number of the last transmitted packet. The most significant bit remains "0" up to the transmission of the $2^{N-1}$-th packet. After this, the most significant bit value is changed to "1" and remains "1" until the failed LSP gets repaired.

On the receive side, when the select counter sees a value of "0" in the most significant bit of a receiving packet, it realizes that it may have to reset the counter. It first checks if the most significant bit of the last accepted packet is "0" or "1. " (Note that the receive side also needs to keep track of the most significant bit of the last accepted packet). If the most significant bit of the last packet is "1, " then the receiver resets the select counter value to the sequence number in the packet that should be "0" if it is the first dual-fed packet. However, the first or first few packets may have been lost. (Note that the packet losses cannot be more than $2^N-1$, since N−1 must be greater than the number of bits required to have a window size of more than the number consecutive losses an LSP can experience.) In that case, the sequence number of the first received dual-fed packet will not be "0." Note that, at the receipt of the first dual-fed packet, the value of the delay counter is also set to the sequence number of the received packet.

Now consider the case when the most significant bit of the last accepted packet is "0." In this case, if the select counter sees a "0" in the most significant bit of the receiving packet, it will first compare the sequence number in the received packet from its own sequence number. If it is smaller than the value in the select counter, then both counters get re-initialized assuming that the received packet is the first dual-fed packet after a failure. (Note that it is assumed that packets on an LSP do not get re-ordered). Otherwise, it will further compare the sequence number in the received packet to the value in the delay counter. If the sequence number in the received packet is greater than the value in the delay counter, then the received packet is accepted, else rejected.

FIG. 5 presents pseudo-code for a delay counter-based algorithm, according to another embodiment of the present invention. This algorithm applies for the case when N−1>P and N−1<P+Q, where N−1 is the number of bits in each packet to carry the sequence number, P is the maximum number of consecutive losses an LSP can experience, and Q is the maximum number of packets by which the trailing LSP can fall behind.

This algorithm assumes that the failure of the LSP will always be detected (e.g., through the signaling plane). This allows the ingress node to re-initialize the variable so that value "0" can be passed in the MSB (most significant bit) to the egress node so that the egress node can reinitialize its variables.

Further, detection of failure enables the scheme to avoid a peculiar condition that may cause at most $2^{N-1}$ wrong packets to be accepted by the egress node after repair of an LSP. For example, if LSP-1 receives the first dual-feed packet, all the variables at the egress node will be reset. Assume that LSP-2 receives an old packet with MSB=0, but a sequence number larger than in the select counter. In this case, the old packet will be accepted. The algorithm will eventually recover, but as many as $2^{N-1}$ old packets might be accepted before such recovery occurs. To avoid such a condition, after detecting the failure, the ingress node should wait for specified duration before initializing its variables in an attempt to make sure that there are no longer any old packets with MSB=0 in transit.

Dual-Sequence Number Algorithm

This algorithm addresses problems associated with the previously described receiver-based counting algorithms and the delay counter-based algorithms. Like the previous two algorithms, the number of bits (N) used to carry sequence number information in each packet of the dual-sequence number algorithm should be greater than the number of consecutive packets (P) that can be lost on an LSP. Unlike the previous two algorithms, however, the dual-sequence number algorithm does not require detection of failure in order to handle conditions where a disruption in the network can cause the drop of a large number of packets (i.e., >N) without being detected by the control plane or interpreted as an LSP failure. Thus, this algorithm behaves like the two sliding window algorithms described earlier, which also do not require detection of failure. For these algorithms, detection of failure may be needed to identify and repair a failed LSP, but such detection is not needed for the algorithms to operate correctly.

A dual-sequence number algorithm uses available in-band bits to carry two sequences instead of one. As before, numbers of one sequence, called the inner sequence, increase every transmitted (dual-feed) packet. This means that, if the inner sequence number assigned to the last transmitted packet is X, then the inner sequence number assigned to the next packet will be X+1. The numbers of second sequence, called the outer sequence, are assigned to a packet after transmission of a fixed number of packets (say Y) from the inner sequence. For example, if Y=8, then a number from the outer sequence is assigned to every $9^{th}$ transmitted packet. This allows the outer sequence to be stretched by a multiple of Y+1 numbers, which can be sufficient to keep track of the number of packets an LSP can trail behind its pair.

To understand this, consider an example where three in-band bits are available in each packet to carry the sequence numbers. Assume that the most significant bit (MSB) is used to indicate the sequence type (inner or outer) of the number carried by the packet. This will give a stretched outer sequence that can keep track of up to 20 packets by which an LSP can fall behind (compared to the 8 packets available using single 3-bit sequence number).

For the above scheme to work properly, Y (i.e., the number of inner sequence packets between two consecutive outer sequence packets) should not be greater than the maximum number of consecutive packets an LSP can loose. This will ensure that no more than one outer sequence packet is lost in a given set of consecutive lost packets, which in turn prevents the receiver from losing track of the outer sequence. Otherwise, the receiver would not be sure which received inner sequence packets correspond to which outer sequence packets.

For example, assume that, after receiving the outer sequence number Z, an LSP loses two consecutive outer sequence numbers Z+1 and Z+2. Now, when an inner sequence packet arrives, the receiver would not be sure if it should consider the packet between Z and Z+1 or between Z+1 and Z+2. A wrong assumption may cause the receiver to accept a packet that should be rejected or reject a packet that should be accepted. Note, given N−1≧P in-band bits, the outer sequence can be stretched at most up to $(2^{N-1} \times 2^{N-1}) + 2^{N-1}$, where $Y = 2^{N-1}$ packets.

If $Q \leq (2^{N-1} \times 2^{N-1}) + 2^{N-1}$, where Q is the maximum number of packets by which an LSP can trail its pair, then, in case of no failures, the scheme based on inner and outer sequence numbers will be able to avoid accepting and rejecting wrong packets. Further, in case of repair from a failure, this scheme allows recovery with a worst-case loss of at most Q packets. This performance is comparable to the performance of the sliding window scheme that involved the use of bits to cover for maximum consecutive packet losses as well as maximum delay that packets on one LSP can experience with respect to their duplicates on the other. Both schemes provide enough sequence numbers to cover maximum packet losses as well as maximum delay.

FIG. 6 presents pseudo-code for a dual-sequence number algorithm, according to another embodiment of the present invention. This algorithm applies for the case when N−1>P and N−1<P+Q, where N−1 is the number of bits in each packet to carry the sequence number, P is the maximum number of consecutive losses an LSP can experience, and Q is the maximum number of packets by which the trailing LSP can fall behind.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method for transmitting packets, comprising the steps of:
   creating first and second duplicate packets from an original packet;
   inserting a sequence number into the first and second duplicate packets;
   tracking a number of transmitted duplicate packets since initiation of duplicate packet transmission;
   performing a comparison between the number of transmitted duplicate packets since the initiation of duplicate packet transmission and a specified threshold number;
   setting a bit in each of the first and second duplicate packets to a first value if the comparison indicates that the number of transmitted duplicate packets since the initiation of duplicate packet transmission is less than the specified threshold number;
   setting the bit in each of the first and second duplicate packets to a second value if the comparison indicates that the number of transmitted duplicate packets since the initiation of duplicate packet transmission is greater than the specified threshold number; and
   transmitting the first and second duplicate packets along respective different paths towards a destination node.

2. The method of claim 1, wherein the bit is maintained at the second value until duplicate packet transmission is re-initiated following a failure of one of the paths.

3. A method for transmitting packets, comprising the steps of:
   creating first and second duplicate packets from an original packet;
   tracking an inner sequence number for the original packet, wherein the inner sequence number changes between each pair of consecutive original packets;
   tracking an outer sequence number for the original packet, wherein the outer sequence number changes only after a specified number of consecutive original packets greater than two;
   selecting a sequence number for the first and second duplicate packets to be either the inner sequence number or the outer sequence number, wherein:
      if the selected sequence number is the inner sequence number, then the first and second duplicate packets are inner sequence packets; and
      if the selected sequence number is the outer sequence number, then the first and second duplicate packets are outer sequence packets;
   inserting the selected sequence number into a same field in the first and second duplicate packets, wherein the same field is used whether the selected sequence number is the inner sequence number or the outer sequence number; and
   transmitting the first and second duplicate packets along respective different paths towards a destination node, wherein a bit in each of the first and second duplicate packets identifies whether the selected sequence number is the inner sequence number or the outer sequence number, wherein a specified number of inner sequence packets are transmitted between each consecutive pair of outer sequence packets.

4. A method for processing received packets, comprising the steps of:
   maintaining a sliding window based on a sequence number of a previously accepted packet;
   receiving a current packet via either a first path or a second path;
   determining whether the sequence number of the current packet falls within the sliding window;
   accepting the current packet, when the sequence number of the current packet falls within the sliding window;
   rejecting the current packet, when the sequence number of the current packet falls outside of the sliding window;
   keeping track of the most significant bit (MSB) of the sequence number of the previously accepted packet; and
   comparing the MSB of the sequence number of the current packet with the MSB of the sequence number in the previously accepted packet to detect a roll-over of the sequence number.

5. The method of claim 4, further comprising the step of adjusting the sliding window to take the roll-over into account.

6. A method for processing received packets, comprising the steps of:
   receiving a current packet via either a first path or a second path;
   maintaining a first least significant bit (LSB) counter and a first most significant bit (MSB) counter for the first path and a second LSB counter and a second MSB counter for the second path;
   identifying whether the current packet has been received via the first path or the second path;
   interpreting the sequence number in the current packet as an LSB sequence number;
   generating a full sequence number by concatenating a current LSB sequence number with a corresponding MSB counter value; and
   comparing the full sequence number to a full sequence number of a previously accepted packet.

7. The method of claim 6, wherein the full sequence number is compared to a full sequence number of a previously accepted packet to determine whether to accept or reject the current packet.

8. The method of claim 6, wherein the current LSB sequence number is compared with the corresponding LSB counter to detect a roll-over of the sequence number.

9. The method of claim 8, wherein the corresponding MSB counter is incremented upon detection of the roll-over.

10. A method for processing received packets having sequence numbers comprising the steps of:
- receiving a current packet having a current sequence number via either a first path or a second path;
- tracking which path is a leading path and which path is a trailing path;
- determining whether the current packet was received from the leading path or the trailing path;
- if the current packet was received from the leading path, then (1) accepting the current packet, (2) updating a select counter based on the current sequence number, and (3) updating a delay counter based on the current sequence number and a previous sequence number of a leading-path packet previously received from the leading path;
- if the current packet was received from the trailing path, then:
  - performing a first comparison between (i) the delay counter and (ii) a difference between the current sequence number and a previous sequence number of a trailing-path packet previously received from the trailing path;
  - if the first comparison indicates that the difference is less than the delay counter, then (1) rejecting the current packet and (2) updating the delay counter based on the current sequence number and the previous trailing-path sequence number; and
  - if the first comparison indicates that the difference is greater than the delay counter, then (1) accepting the current packet; (2) updating the select counter based on the current sequence number, (3) updating the delay counter based on the current sequence number and the previous trailing-path sequence number; and (4) identifying the trailing path as the leading path.

11. The method of claim 10, wherein:
the received packets are duplicate packets transmitted during duplicate packet transmission; and
a bit in the current packet identifies whether a number of transmitted duplicate packets since initiation of duplicate packet transmission is less than a specified threshold number.

12. The method of claim 11, wherein the bit is used to detect initiation of duplicate packet transmission following a failure of one of the first or second paths.

13. The method of claim 11, further comprising:
performing a determination of the value of the bit; and
if the determination indicates that the number of transmitted duplicate packets since the initiation of duplicate packet transmission is less than the specified threshold number, then:
- performing a second comparison between the bit and the corresponding bit of the previously accepted packet;
- if the second comparison indicates that the bit and the corresponding bit have different values, then (1) resetting the select counter and the delay counter based on the current sequence number; and
- if the second comparison indicates that the bit and the corresponding bit have the same value, then:
  - performing a third comparison between the current sequence number and the select counter;
  - if the third comparison indicates that the current sequence number is less than the select counter, then (1) accepting the current packet and (2) resetting the select counter and the delay counter based on the current sequence number; and
  - if the third comparison indicates that the current sequence number is greater than the select counter, then:
    - performing a fourth comparison between the current sequence number and the delay counter;
    - if the fourth comparison indicates that the current sequence number is greater than the delay counter, then accepting the current packet; and
    - if the fourth comparison indicates that the current sequence number is less than the delay counter, then rejecting the current packet.

14. The method of claim 10, wherein the delay counter is adjusted based on a difference between the current sequence number and a previous same-path sequence number.

15. A method for processing received packets having sequence numbers, comprising the steps of:
- storing previous inner and outer sequence numbers associated with a previously accepted packet;
- receiving a current packet having a current sequence number via either a first path or a second path, wherein a bit in the current packet identifies whether the current sequence number is an inner sequence number or an outer sequence number, wherein:
  - if the current sequence number is the inner sequence number, then the current packet is an inner sequence packet;
  - if the current sequence number is the outer sequence number, then the current packet is an outer sequence packet; and
  - a specified number of inner sequence packets are transmitted between each consecutive pair of outer sequence packets;
- determining, based on the current sequence number and the bit, a current inner sequence number and a current outer sequence number for the current packet, wherein the current packet contains one of the current inner sequence number and the current outer sequence number, but not both; and
- comparing the current inner and outer sequence numbers for the current packet to the previous inner and outer sequence numbers associated with the previously accepted packet to determine whether to accept the current packet.

* * * * *